(12) United States Patent
Slezak et al.

(10) Patent No.: US 9,411,076 B2
(45) Date of Patent: Aug. 9, 2016

(54) PIGMENTED POLYMERIZABLE COMPOSITIONS AND OPTICAL ARTICLES PREPARED THEREFROM

(71) Applicant: PPG INDUSTRIES OHIO, INC., Cleveland, OH (US)

(72) Inventors: Brandy D. Slezak, Export, PA (US); Royann L. Stewart-Davis, Springdale, PA (US); Robert D. Herold, Monroeville, PA (US); Mark P. Bowman, New Kensington, PA (US); Joseph S. Szul, Canfield, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 72 days.

(21) Appl. No.: 14/025,300

(22) Filed: Sep. 12, 2013

(65) Prior Publication Data

US 2014/0080972 A1  Mar. 20, 2014

Related U.S. Application Data

(60) Provisional application No. 61/700,934, filed on Sep. 14, 2012.

(51) Int. Cl.
*G02B 1/04* (2006.01)

(52) U.S. Cl.
CPC ....................................... *G02B 1/04* (2013.01)

(58) Field of Classification Search
CPC ............................................................ G02B 1/04
USPC .................................................. 524/780, 700
See application file for complete search history.

(56) References Cited

U.S. PATENT DOCUMENTS

| | | | |
|---|---|---|---|
| 5,750,593 A | 5/1998 | Castegnier et al. | |
| 5,830,578 A | 11/1998 | Ono et al. | |
| 5,949,518 A | 9/1999 | Belmares et al. | |
| 6,027,816 A | 2/2000 | Ono et al. | |
| 6,770,705 B2 * | 8/2004 | Vanier et al. | 524/560 |
| 6,852,780 B2 | 2/2005 | Fujita et al. | |
| 7,261,845 B2 | 8/2007 | Itoh et al. | |
| 8,106,108 B2 | 1/2012 | Chen | |
| 8,129,466 B2 | 3/2012 | Polk et al. | |
| 8,173,739 B2 | 5/2012 | Smetana | |
| 2003/0162876 A1 | 8/2003 | Vanier et al. | |
| 2005/0134795 A1 | 6/2005 | Lally et al. | |
| 2012/0187351 A1 * | 7/2012 | Ito et al. | 252/586 |
| 2012/0200925 A1 | 8/2012 | Iwasa et al. | |

FOREIGN PATENT DOCUMENTS

| | | |
|---|---|---|
| CN | 1958643 A | 5/2007 |
| CN | 101359103 A | 2/2009 |
| EP | 1271186 A1 | 1/2003 |
| EP | 1331494 A1 | 7/2003 |
| JP | 05-194616 A | 8/1993 |
| JP | 05-195446 A | 8/1993 |
| JP | 2003105227 A | 4/2003 |
| WO | WO 99/26087 A1 | 5/1999 |
| WO | WO 02/41042 A1 | 5/2002 |

\* cited by examiner

*Primary Examiner* — Kelechi Egwim
(74) *Attorney, Agent, or Firm* — The Webb Law Firm

(57) ABSTRACT

Provided is a polymerizable composition including: (a) a polymerizable component; and (b) a pigment component the pigment component includes: (i) an ionic or amphoteric dispersant material; and (ii) pigment nanoparticles uniformly dispersed in the dispersant material (i). The nanoparticles have a particle size of up to 500 nanometers. Also provided is a polymerizable composition of: (a) a polymerizable component including: (i) diethylene glycol bis(allyl carbonate); and (ii) a radical initiator; and (b) a pigment component which includes: (i) an ionic or amphoteric dispersant material derived from polycaprolactone; and (ii) pigment nanoparticles of ultramarine blue having an average particle size of up to 500 nanometers, uniformly dispersed in the dispersant material.

19 Claims, No Drawings

PIGMENTED POLYMERIZABLE COMPOSITIONS AND OPTICAL ARTICLES PREPARED THEREFROM

CROSS REFERENCE TO RELATED APPLICATIONS

This application claims the benefit of priority from U.S. Provisional Patent Application No. 61/700,934, filed Sep. 14, 2012, which is incorporated herein by reference in its entirety.

FIELD OF THE INVENTION

The present invention relates to polymerizable compositions that are useful for preparing optical articles.

BACKGROUND OF THE INVENTION

Polymeric materials, such as plastics, have been developed as alternatives and replacements for silica based inorganic glass in applications such as, optical lenses, fiber optics, windows and automotive, nautical and aviation transparencies as well as transparent elements for electronic devices. These polymeric materials can provide advantages relative to glass, including, shatter resistance, lighter weight for a given application, ease of molding and ease of dyeing. Representative examples of such polymeric materials include, poly(methyl methacrylate), polycarbonate and poly(diethylene glycol bis(allylcarbonate)).

Polymeric materials (polymerizates) often demonstrate yellowing, even upon the addition of certain organic dyes intended to be intense colorants or more subtle yellowing masks. It is believed that this is due to the degradation of these organic dyes by high energy species such as radical initiators and/or ultraviolet photons in the form of photoinitiators or exposure to ambient radiation. The addition of inorganic pigments to overcome these problems often leads to haze and a decrease in light transmission ("% Transmission").

It would be desirable to develop polymerizable compositions that provide desirable color and optical properties to an optical article prepared therefrom, with minimal haze.

SUMMARY OF THE INVENTION

In accordance with the present invention, there is provided a polymerizable composition comprising:
(a) a polymerizable component; and
(b) a pigment component comprising:
(i) an ionic or amphoteric dispersant material; and
(ii) pigment nanoparticles uniformly dispersed in the dispersant material (i), wherein the nanoparticles have an average particle size of up to 500 nanometers (nm). Also provided in a particular embodiment is a polymerizable composition comprising:
(a) a polymerizable component comprising:
(i) diethylene glycol bis(allyl carbonate); and
(ii) a radical initiator; and
(b) a pigment component comprising:
(i) an ionic or amphoteric dispersant material derived from polycaprolactone; and
(ii) pigment nanoparticles comprising ultramarine blue uniformly dispersed in the dispersant material (i), wherein the nanoparticles have an average particle size of up to 500 nanometers.

DETAILED DESCRIPTION OF THE INVENTION

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e g., prepared from a single monomer species), and copolymers (e.g., prepared from at least two monomer species).

As used herein, the term "(meth)acrylate" and similar terms, such as (meth)acryloyl and (meth)acrylic acid ester, means methacrylate and acrylate. Either or both, when they exist, may be present in a composition.

As used herein, the term "thio(meth)acrylate" and similar terms, such as thio(meth)acryloyl and thio(meth)acrylic acid ester, means thiomethacrylate and thioacrylate, as above.

As used herein, recitations of "linear or branched" groups, such as linear or branched alkyl, are understood to include: a methylene group or a methyl group; groups that are linear, such as linear $C_2$-$C_{25}$ alkyl groups; and groups that are appropriately branched, such as branched $C_3$-$C_{25}$ alkyl groups.

As used herein, the term "halo" and similar terms, such as halo group, halogen, halogen group, halide, and halide group means F, Cl, Br and/or I, such as fluoro, chloro, bromo and/or iodo.

As used herein the term "hydrocarbyl" and similar terms, such as "hydrocarbyl substituent," means: linear or branched $C_1$-$C_{25}$ alkyl (e.g., linear or branched $C_1$-$C_{10}$ alkyl); linear or branched $C_2$-$C_{25}$ alkenyl (e.g., linear or branched $C_2$-$C_{10}$ alkenyl), linear or branched $C_2$-$C_{25}$ alkynyl (e.g., linear or branched $C_2$-$C_{10}$ alkynyl): $C_3$-$C_{18}$ cycloalkyl, including poly-fused-ring cycloalkyl, and polycycloalkyl (e.g., $C_3$-$C_{10}$ cycloalkyl); $C_5$-$C_{18}$ aryl, including polycyclic or poly-fused-ring aryl (e.g., $C_5$-$C_{10}$ aryl); and $C_6$-$C_{24}$ aralkyl (e.g., $C_6$-$C_{10}$ aralkyl).

As used herein the term "hydrocarbyl" is inclusive of "heterohydrocarbyl," which is a hydrocarbyl in which at least one carbon, but less than all of the carbons thereof, has been replaced with a heteroatom, such as, but not limited to, O, N, S, and combinations thereof. Examples of heterohydrocarbyls from which a hydrocarbyl can be selected include, but are not limited to: $C_3$-$C_{18}$ heterocycloalkyl (having at least one hetero atom in the cyclic ring), including poly-fused-ring heterocycloalkyl, and polycyclicheteroalkyl; and $C_5$-$C_{18}$ heteroaryl (having at least one hetero atom in the aromatic ring), including polycyclic or poly-fused-ring heteroaryl.

Representative alkyl groups include but are not limited to methyl, ethyl, propyl, isopropyl, butyl, isobutyl, sec-butyl, tert-butyl, pentyl, neopentyl, hexyl, heptyl, actyl, nonyl, decyl, and structural isomers thereof. Representative alkenyl groups include but are not limited to vinyl, allyl, propenyl, butenyl, pentenyl, hexenyl, heptenyl, structural isomers thereof, and related species thereof containing two or more ethylenically unsaturated groups. Representative alkynyl groups include but are not limited to ethynyl, 1-propynyl, 2-propynyl, 1-butynyl, and 2-butynyl, Representative cycloalkyl groups include but are not limited to cyclopropyl, cyclobutyl, cyclopentyl, cyclohexyl, and cyclooctyl substituents. Representative poly-fused-ring cycloalkyl groups include but are not limited to decahydronaphthalenyl, tetradecahydroanthracenyl, and tetradecahydrophenanthrenyl. Representative polycyclicalkyl groups include but are not limited to, bicyclo[2.2.1]heptanyl (norbornyl), and bicyclo [2.2.2]octanyl. Representative heterocycloalkyl groups include but are not limited to tetrahydrofuranyl, tetrahydropyranyl and piperidinyl, including but not limited to piperidin-4-yl, Representative polycyclicheterocycloalkyl groups include but are not limited to, 7-thiabicyclo[2.2.1]heptanyl, 7-oxabicyclo[2.2.1]heptanyl, and 7-azabicyclo[2.2.1]heptanyl, Representative aryl groups include but are not limited to phenyl, biphenyl, naphthyl, anthracenyl, phenanthrenyl and triptycenyl. Representative heteroaryl groups include but are not limited to furanyl, pyranyl and pyridinyl. Representative aralkyl groups include but are not limited to benzyl, and phenethyl.

As used herein, the term "optionally substituted" with regard to groups, including but not limited to, hydrocarbyl groups, alkyl groups, cycloalkyl groups, and aryl groups, means a group, including but not limited to, a hydrocarbyl group, alkyl group, cycloalkyl group, and/or aryl group, in which at least one hydrogen thereof has been replaced or substituted with a group that is other than hydrogen, such as, but not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (including, but not limited to: alkyl; alkenyl; alkynyl; cycloalkyl, including poly-fused-ring cycloalkyl and polycycloalkyl; heterocycloalkyl; aryl, including hydroxyl substituted aryl, such as phenol, and including poly-fused-ring aryl; heteroaryl, including poly-fused-ring heteroaryl: and aralkyl groups), and amine groups, such as —N($R^{11}$)($R^{12}$) where $R^{11'}$ and $R^{12'}$ are each independently selected from hydrogen, hydrocarbyl and substituted hydrocarbyl.

For purposes of non-limiting illustration, the hydrocarbyl, of a substituted hydrocarbyl, can be selected from one or more of the hydrocarbyl groups described previously herein, such as a linear or branched $C_1$-$C_{25}$ alkyl group, which can be substituted with one or more of the substituting groups described previously herein, such as one or more $C_3$-$C_{12}$ cycloalkyl groups and/or one or more $C_5$-$C_{18}$ aryl groups, for example, an ethyl group substituted with a cyclohexyl group and/or a phenyl group. Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, the articles "a," "an," and "the" include plural referents unless otherwise expressly and unequivocally limited to one referent.

Other than in the operating examples, or where otherwise indicated, all numbers expressing quantities of ingredients, reaction conditions, and so forth used in the specification and claims are to be understood as modified in all instances by the term "about."

The polymerizable compositions of the present invention comprise (a) a polymerizable component, which may include monomers, oligomers, and/or prepolymers with polymerizable functional groups. The polymerizable components may include species with sulfur, halogens or other substituent atoms or groups, provided they do not interfere with polymerization reactions. The polymerizable component may in turn comprise, for example, a compound containing two ethylenically unsaturated groups such as a diallyl ester, a diallyl carbonate such as diethylene glycol bis(allyl carbonate), and/or a diallyl phthalate such as diallyl isophthalate, diallyl terephthalate, and diallyl orthophthalate. Other materials include acyclic non-conjugated dienes, acyclic polyvinyl ethers, allyl-(meth)acrylates vinyl-(meth)acrylates, di(meth)acrylate esters of diols, sulfur-containing di(meth)acrylate esters such as di(meth)acrylate esters of dithiols, di(meth)acrylate esters of poly(alkyleneglycol) diols, monocyclic non-aromatic dienes, polycyclic non-aromatic dienes, aromatic ring-containing dienes, diallyl esters of aromatic ring dicarboxylic acids, divinyl esters of aromatic ring dicarboxylic acids, and/or mixtures thereof.

Non-limiting examples of acyclic non-conjugated dienes can include those represented by the following general formula:

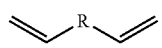

wherein R can represent C1 to C30 linear or branched divalent saturated alkylene radical, or C2 to C30 divalent organic radical including groups such as but not limited to those containing ether, thioether, ester, thioester, ketone, polysulfide, sulfone and combinations thereof. The acyclic non-conjugated dienes can be selected from 1,5-hexadiene, 1,6-heptadiene, 1,7-octadiene and mixtures thereof.

Non-limiting examples of suitable acyclic polyvinyl ethers can include those represented by the following structural formula:

$$CH_2=CH-O-(-R2-O-)_m-CH=CH_2$$

wherein R2 can be C2 to C6 n-alkylene, C3 to C6 branched alkylene group, or —[($CH_2$—)$_p$—O—]$_q$—(—CH2—)$_r$—, m can be a rational number from 0 to 10, often 2; p can be an integer from 2 to 6, q can be an integer from 1 to 5 and r can be an integer from 2 to 10.

Non-limiting examples of suitable polyvinyl ether monomers for use can include divinyl ether monomers, such as ethylene glycol divinyl ether, diethylene glycol divinyl ether, triethyleneglycol divinyl ether, and mixtures thereof.

Di(meth)acrylate esters of linear diols can include ethanediol di(meth)acrylate, 1,3-propanediol dimethacrylate, 1,2-propanediol di(meth)acrylate, 1,4-butanediol di(meth)acrylate, 1,3-butanediol di(meth)acrylate, 1,2-butanediol di(meth)acrylate, and mixtures thereof.

Di(meth)acrylate esters of dithiols can include, for example, di(meth)acrylate of 1,2-ethanedithiol including oligomers thereof, di(meth)acrylate of dimercaptodiethyl sulfide (i.e., 2,2'-thioethanedithiol di(meth)acrylate) including oligomers thereof, di(meth)acrylate of 3,6-dioxa-1,8-octanedithiol including oligomers thereof, di(meth)acrylate of 2-mercaptoethyl ether including oligomers thereof, di(meth)acrylate of 4,4'-thiodibenzenethiol, and mixtures thereof.

Further non-limiting examples of suitable dienes can include monocyclic aliphatic dienes such as those represented by the following structural formula:

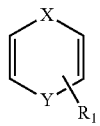

wherein X and Y each independently can represent C1-10 divalent saturated alkylene radical; or C1-5 divalent saturated alkylene radical, containing at least one element selected from the group of sulfur, oxygen and silicon in addition to the carbon and hydrogen atoms; and R1 can represent H, or C1-C10 alkyl; and

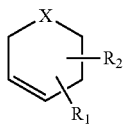

wherein X and R1 can be as defined above and R2 can represent C2-C10 alkenyl. The monocyclic aliphatic dienes can include 1,4-cyclohexadiene, 4-vinyl-1-cyclohexene, dipentene and terpinene.

Non-limiting examples of polycyclic aliphatic dienes can include 5-vinyl-2-norbornene; 2,5-norbornadiene; dicyclopentadiene and mixtures thereof.

Non-limiting examples of aromatic ring-containing dienes can include those represented by the following structural formula:

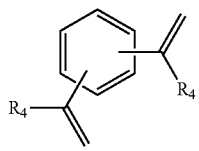

wherein R4 can represent hydrogen or methyl. Aromatic ring-containing dienes can include monomers such as diisopropenyl benzene, divinyl benzene and mixtures thereof.

Examples of diallyl esters of aromatic ring dicarboxylic acids can include but are not limited to those represented by the following structural formula:

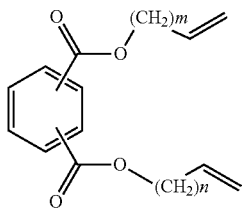

wherein m and n each independently can be an integer from 0 to 5. The diallyl esters of aromatic ring dicarboxylic acids can include o-diallyl phthalate, m-diallyl phthalate, p-diallyl phthalate and mixtures thereof.

Other polymerizable components include 5-vinyl-2-norbornene, ethylene glycol divinyl ether, diethylene glycol divinyl ether, triethylene glycol divinyl ether, butane diol divinyl ether, vinylcyclohexene, 4-vinyl-1-cyclohexene, dipentene, terpinene, dicyclopentadiene, cyclododecadiene, cyclooctadiene, 2-cyclopenten-1-yl-ether, 2,5-norbornadiene, divinylbenzene including 1,3-divinylbenzene, 1,2-divinylbenzene, and 1,4-divinylbenzene, diisopropenylbenzene including 1,3-diisopropenylbenzene, 1,2-diisopropenylbenzene, and 1,4-diisopropenylbenzene, allyl(meth)acrylate, ethanediol di(meth)acrylate, 1,3-propanediol di(meth)acrylate, 1,2-propanediol di(meth)acrylate, 1,3-butanediol di(meth)acrylate, 1,2-butanediol di(meth)acrylate, ethylene glycol di(meth)acrylate, diethylene glycol di(meth)acrylate, dimercaptodiethylsulfide di(meth)acrylate, 1,2-ethanedithiol di(meth)acrylate, and/or mixtures thereof.

Other non-limiting examples of suitable di(meth)acrylate monomers can include ethylene glycol di(meth)acrylate, 1,3-butylene glycol di(meth)acrylate, 1,4-butanediol di(meth)acrylate, 2,3-dimethyl-1,3-propanediol di(meth)acrylate, 1,6-hexanediol di(meth)acrylate, propylene glycol di(meth)acrylate, dipropylene glycol di(meth)acrylate, tripropylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxylated neopentyl glycol di(meth)acrylate, pentanediol di(meth)acrylate, cyclohexane dimethanol di(meth)acrylate, and ethoxylated Bisphenol A di(meth)acrylate.

In particular embodiments the polymerizable component may include monomers, oligomers, and/or prepolymers one or more of the following: allyl diglycol carbonate; poly(meth)acrylate precursors; polycarbonate precursors; polyurethane precursors; polyureaurethane precursors; polythiourethane precursors; and polyamide precursors. By "precursors" is meant functional compounds or monomers used to prepare the resinous material; for example, polyurethane precursors would include polyols and polyisocyanates. The polymerizable compositions of the present invention can optionally include, in some embodiments, one or more monomers having a single ethylenically unsaturated radically polymerizable group. Examples of monomers having a single ethylenically unsaturated radically polymerizable group that can optionally be present in the polymerizable compositions of the present invention include, but are not limited to: acrylic acid; methacrylic acid; esters of acrylic acid such as methyl or ethyl acrylate and 2-hydroxyethyl acrylate; esters of methacrylic acid, such as methyl or ethyl methacrylate, phenoxyethyl methacrylate, isobornyl methacrylate, cyclohexyl methacrylate and 2-hydroxyethyl methacrylate; allyl esters, e.g., allyl benzoate; allyl carbonates, e.g., phenyl allyl carbonate; vinyl esters such as vinyl acetate; styrene; and vinyl chloride. In some embodiments, the monoethylenically unsaturated monomers include, methyl methacrylate, isobornyl methacrylate, phenoxyethyl methacrylate, cyclohexyl methacrylate, styrene and mixtures thereof. The monoethylenically unsaturated monomer(s), when used, is typically present in an amount of from 0.1 percent by weight to 60 percent by weight, based on the total monomer weight of the polymerizable composition, such as from 3 percent by weight to 55 percent by weight, or from 20 to 45 percent by weight, based on the total monomer weight of the polymerizable composition.

In particular embodiments of the present invention, the polymerizable component may comprise at least one first (meth)acrylate functional monomer represented by the following Formula (I), Formula (I)

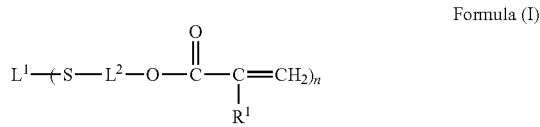

With reference to Formula (I), $L^1$ is selected from at least one of (i) a multivalent optionally substituted hydrocarbyl group optionally interrupted with at least one of —C(O)—, —S—, —O— and combinations thereof, and (ii) a divalent linking group represented by the following Formula (A),

Formula (A)

With reference to Formula (A), Y is O or S. With further reference to Formula (I): $L^2$ is independently for each subscript-n, a divalent optionally substituted hydrocarbyl group optionally interrupted with at least one of —O— and —S—; $R^1$ is independently selected, for each subscript-n, from hydrogen and methyl; and subscript-n is from 2 to 6.

The polymerizable component may additionally or alternatively comprise a polymerizable composition comprising at least one thio(meth)acrylate functional monomer represented by the following Formula (II).

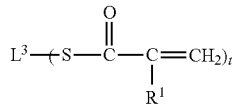

(II)

With reference to Formula (II): $L^3$ is a multivalent optionally substituted hydrocarbyl group optionally interrupted with at least one of —C(O)—, —S—, —O— and combinations thereof; $R^8$ is independently selected for each t from hydrogen and methyl; and t is from 2 to 6. In addition to including at least one thio(meth)acrylate monomer represented by Formula (II), the polymerizable composition may also comprise at least one (meth)acrylate functional monomer represented by the following Formula (III).

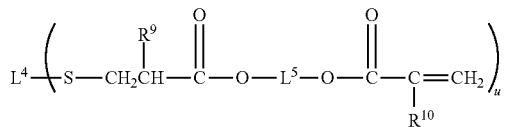

(III)

With reference to Formula (III): $L^4$ is a multivalent optionally substituted hydrocarbyl group optionally interrupted with at least one of —C(O)—, —S—, —O— and combinations thereof; $L^5$ is independently for each u a divalent optionally substituted hydrocarbyl group; $R^9$ and $R^{10}$ are each independently selected for each u from hydrogen and methyl; and u is from 2 to 6.

The polymerizable component may additionally or alternatively comprise a polymerizable composition comprising at least one (meth)acrylate functional monomer represented by the following Formula (IV),

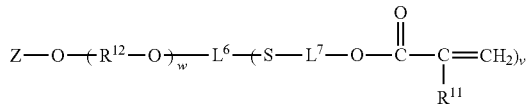

Formula (IV)

With reference to Formula (IV): $L^6$ is selected from a multivalent optionally substituted hydrocarbyl group; $L^7$ is independently for each v a divalent optionally substituted hydrocarbyl group optionally interrupted with at least one of —O— and —S—, $R^{11}$ is independently selected for each v from hydrogen and methyl, v is from 2 to 6; and $R^{12}$ is independently for each w divalent optionally substituted hydrocarbyl. With further reference to Formula (IV), w is 0 to 10, and Z is selected from hydrogen or a group represented by the following Formula (V),

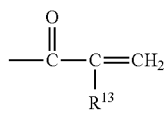

Formula (V)

With reference to Formula (V), $R^{13}$ is hydrogen or methyl.

The monomers of the polymerizable compositions of the present invention as described herein, including monomers represented by Formula (I), Formula (I), Formula (III), Formula (IV) and related monomers, in each case optionally further include one or more coproducts that include one or more radically polymerizable ethylenically unsaturated groups, such as, but not limited to oligomers that include one or more radically polymerizable ethylenically unsaturated groups, resulting from the synthesis of such monomers. The coproducts, such as oligomeric coproducts, can optionally also be present in the polymerizable compositions of the present invention.

The polymerizable compositions of the present invention further can include, with some embodiments, a polymerization moderator. The presence of polymerization moderator can minimize the formation of any distortions or defects, e.g., striations and or cracks/fissures, in polymerizates that may be obtained from the polymerizable compositions of the present invention. Examples of polymerization moderators that can be included in the polymerizable compositions of the present invention, include but are not limited to, dilauryl thiodipropionate, 1-isopropyl-4-methyl-1,4-cyclohexadiene (γ-terpinene); 1-isopropyl-4-methyl-1,3-cyclohexadiene (α-terpinene); 1-methyl-4-(propan-2-ylidene)cyclohex-1-ene (terpinolene); and alpha-methyl styrene dimer, 1,1-diphenylethylene, cis-1,2-diphenylethylene, 3,3,7-trimethylbicyclo[4,1,0]hept-3-ene (3-carene), 4-isopropenyl-1-methylcyclohexene (dipentene), (S)-(–)-4-isopropenyl-1-methylcyclohexene ((S)-limonene), 2,6-dimethyl-2,4,6-octatriene, 4-tert-butylpyrocatechol, and mixtures of two or more thereof.

With some embodiments, the polymerization moderator is selected from 1-isopropyl-4-methyl-1,4-cyclohexadiene; 1-isopropyl-4-methyl-1,3-cyclohexadiene; 1-methyl-4-(propan-2-ylidene)cyclohex-1-ene; and alpha-methyl styrene dimer.

As used herein, the term "alpha-methyl styrene dimer" means a polymerization moderator that includes 2,4-diphenyl-4-methyl-1-pentene, and optionally at least one of 2,4-diphenyl-4-methyl-2-pentene and/or 2-phenyl-1-propene (which is also referred to as, alpha-methyl styrene). With some embodiments, the alpha-methyl styrene dimer polymerization moderator includes 90 to 93 percent by weight of 2,4-diphenyl-4-methyl-1-pentene, 6 to 8 percent by weight of 2,4-diphenyl-4-methyl-2-pentene, and 0.25 to 0.75 percent by weight of 2-phenyl-1propene, the percent weights in each case being based on total weight of alpha-methyl styrene dimmer.

The polymerization moderator can be present in the polymerizable compositions of the present invention in a wide range of amounts. In some embodiments, the polymerization moderator is present in the polymerizable compositions of the present invention, in an amount from 0.01 percent to 15 percent by weight, or from 0.1 percent to 8 percent by weight, or from 0.3 percent to 5 percent by weight, based on the total weight of monomers and polymerization moderator.

In particular embodiments of the present invention the polymerizable composition further comprises a radical initiator for either thermal or photoinitiation. The initiator may be part of the polymerizable component. Examples of organic peroxy compounds that may be used as radical polymerization initiators include, but are not limited to: peroxymonocarbonate esters, such as tertiarybutylperoxy 2-ethylhexyl carbonate and tertiarybutylperoxy isopropyl carbonate; peroxyketals, such as 1,1-di-(t-butyl peroxy)-3,3,5-trimethylcyclohexane; peroxydicarbonate esters, such as di(2-ethylhexyl)peroxydicarbonate, di(secondary butyl)peroxydicarbonate and diisopropylperoxydicarbonate; diacylperoxides, such as 2,4-dichlorobenzoyl peroxide, isobutyryl peroxide, decanoyl peroxide, lauryl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide.

With some embodiments, further examples of peroxy compounds from which the free radical initiator can be selected include, but are not limited to, 2,5-dimethyl-2,5-di(2-ethylhexanoylperoxy)hexane, and/or 1,1-bis(tert-butylperoxy)-3,3,5-trimethylcyclohexane.

In particular embodiments the peroxy initiator may be, for example, peroxybenzoate, diisopropylperoxy dicarbonate (IPP), disec-butylperoxy dicarbonate, benzoyl peroxide (BPO), or tert-butyl peroxybenzoate (BPB), available from AKZO Nobel Polymer Chemicals as TRIGONOX C, tert-butylperoxy 2-ethylhexyl carbonate (TBEC) and TRIGONOX ADC-NS60 available from AKZO Nobel.

Examples of other compounds that may be used as polymerization initiators include, but are not limited to, 2-hydroxy-2-methyl-1-phenyl-propan-1-one available as DAROCUR 1173 from Ciba-Geigy.

The radical initiator is typically used in an amount sufficient to effect an addition polymerization reaction among the ethylenically unsaturated groups in the polymerizable component. The amount of polymerization initiator used to initiate and polymerize the polymerizable compositions of the present invention can vary, and can depend at least in part on the particular initiator or initiators used. With some embodiments, only that amount that is required to initiate and sustain the polymerization reaction is required, which can be referred to as an initiating amount. With some embodiments, the thermally activated free radical initiator is present in an amount of from 0.01 and 7 parts of initiator, or from 0.1 to 3.5 parts initiator, or from 0.5 to 2.5 parts initiator, in each case the parts initiator being per 100 parts of monomer(s) (phm) present in the polymerizable composition.

The polymerizable compositions of the present invention further comprise (b) a pigment component, which in turn comprises (i) a dispersant material and (ii) pigment nanoparticles. The dispersant material is selected so as to be compatible with the polymerizable component in the composition. By "compatible" is meant that the two materials are at least partially miscible with each other and neither causes flocculation or any other type of precipitation of the other upon mixing. The dispersant material is typically an ionic or amphoteric material such as a surfactant. Anionic surfactants contain anionic functional groups at their head, such as sulfate, sulfonate, phosphate, and carboxylates. Particular alkyl sulfates include ammonium lauryl sulfate, sodium lauryl sulfate (SDS, sodium dodecyl sulfate, another name for the compound) and the related alkyl-ether sulfates sodium laureth sulfate, also known as sodium lauryl ether sulfate (SLES), and sodium myreth sulfate.

Carboxylates may comprise the alkyl carboxylates (soaps), such as sodium stearate. More specialized species include sodium lauroyl sarcosinate and carboxylate-based fluorosurfactants such as perfluorononanoate, perfluorooctanoate (PFOA or PFO).

Cationic surfactants include pH-dependent primary, secondary, or tertiary amines: Primary amines become positively charged at pH<10, secondary amines become charged at pH<4. Permanently charged quaternary ammonium cations are also suitable.

Zwitterionic (amphoteric) surfactants have both cationic and anionic centers attached to the same molecule. The cationic part is based on primary, secondary, or tertiary amines or quaternary ammonium cations. The anionic part can be more variable and include sulfonates, as in CHAPS (3[(3-Cholamidopropyl)dimethylammonio]-1-propanesulfonate); sultaines such as cocamidopropyl hydroxysultaine; betaines, e.g., cocamidopropyl betaine; and phosphates.

The dispersant material is often derived from an acrylic polymer and/or polycaprolactone. Such dispersants may be selected from DISPERBYK 2050, available from BYK Additives and Instruments, and SOLSPERSE 32500, available from Lubrizol Ltd. An alternate suitable acrylic polymeric dispersant may be prepared from glycidyl methacrylate, n-butyl methacrylate. N-butyl acrylate, and hydroxypropyl methacrylate, as described in SYNTHESIS EXAMPLE A in U.S. Pat. No. 8,129,466, incorporated herein by reference.

The pigment component (b) further contains (ii) pigment nanoparticles uniformly dispersed in the dispersant material. The pigment nanoparticles typically have an average particle size of up to 500 nanometers (i. e., 500 nm or less), such as 200 nanometers or less. In particular embodiments of the present invention, at least 90% of the particles in the pigment component demonstrate an average particle size up to 300 nm. A particle size smaller than that of the wavelength of visible light prevents light scattering. Larger particle sizes are not recommended because they often lead to haze in a polymerizate prepared from the polymerizable composition. Larger particle sizes also cause "settling" of the pigment in the pigment dispersion resulting in metering difficulties and variable tinting.

The pigment nanoparticles may be organic or inorganic. They are selected so as to be stable; i. e., chemically inert, in a polymerizable composition that contains radical initiators or that may later be exposed to ultraviolet radiation after polymerization. Often radical initiators and other high energy species such as UV light degrade pigments, particularly organic pigments, due to their nature as strong oxidizing agents.

Suitable inorganic pigments include metal-containing inorganic pigments such as those containing cadmium, carbon, chromium, cobalt, copper, iron oxide, lead, mercury, titanium, tungsten, and zinc. Examples include ultramarine blue, ultramarine violet, reduced tungsten oxide, cobalt aluminate, cobalt phosphate, manganese ammonium pyrophosphate and/or metal-free inorganic pigments. In particular embodiments the inorganic pigment nanoparticles comprise ultramarine blue, ultramarine violet, Prussian blue, cobalt blue and/or reduced tungsten oxide. Examples of specific organic pigments include indanthrone, quinacridone, phthalocyanine blue, copper phthalocyanine blue, and/or perylene anthraquinone.

Additional examples of pigments include the following: iron oxide pigments, in all their shades of yellow, brown, red and black; in all their physical forms and grain categories; titanium oxide pigments in all the different inorganic surface treatments; chromium oxide pigments also co-precipitated with nickel and nickel titanates; black pigments from organic combustion (e. g., carbon black); blue and green pigments derived from copper phthalocyanine, also chlorinated and brominated, in the various alpha, beta and epsilon crystalline forms; yellow pigments derived from lead sulphochromate; yellow pigments derived from lead bismuth vanadate; orange pigments derived from lead sulphochromate molybdate; yellow pigments of an organic nature based on arylamides; orange pigments of an organic nature based on naphthol; orange pigments of an organic nature based on diketo-pyrrolo-pyrrole; red pigments based on manganese salts of azo dyes; red pigments based on manganese salts of beta-oxynaphthoic acid; red organic quinacridone pigments; red organic anthraquinone pigments.

The pigment nanoparticles are typically present in the polymerizable composition in an amount ranging from 0.01 to 1000 ppm, often 0.05 to 50 ppm.

Additional materials may be added to the polymerizable compositions of the present invention, such as UV light absorbers, hindered amine light stabilizers, and the like, to promote optical properties of polymerizates formed from the polymerizable compositions.

In a particular embodiment of the present invention, the polymerizable composition comprises:
(a) a polymerizable component comprising:
 (i) diethylene glycol bis(allyl carbonate); and
 (ii) a radical initiator, typically a peroxy initiator; and
(b) a pigment component comprising:
 (i) an ionic or amphoteric dispersant material derived from polycaprolactone; and
 (ii) pigment nanoparticles comprising ultramarine blue uniformly dispersed in the dispersant material (i), wherein the nanoparticles have a particle size of up to 500 nanometers.

The thermal cure cycle used to cure the polymerizable compositions of the present invention, in some embodiments such as addition polymerization, involves heating the polymerizable composition from room temperature up to 50° C. to 150° C., over a period of from 2 hours to 48 hours, or from 55° C. up to 90° C. or 100° C. over a period of from 12 to 24 hours, or from 65° C. up to 115° C. or 125° C. over a period of from 12 to 24 hours. For other polymerizable species, typical curing conditions may range from 50° F. to 475° F. (10° C. to 246° C.) for 1 to 30 minutes, such as 265° to 350° F. (129° to 175° C.) for 20 to 30 minutes.

Polymerization of the compositions of the present invention results in the formation of a polymerizate, which can be made in the form of a shaped article, such as by rolling to form a sheet or by molding. Polymerizates obtained from polymerization of the polymerizable compositions of the present invention are solid, and in some embodiments, transparent.

The polymerizable compositions described above may be used to prepare optical articles demonstrating high refractive indices, desired color properties, acceptable haze and or increased color stability in the presence of ultraviolet radiation compared to optical articles prepared from polymerizable compositions that do not contain the pigment component.

Polymerizates prepared from the polymerizable compositions of the present invention can be used to form solid articles such as optical element(s) or device(s). As used herein the term "optical" means pertaining to or associated with light and/or vision. For example, the optical element or device can comprise ophthalmic elements and devices, and sheet products such as display elements and devices, windows, mirrors, and/or active and passive liquid crystal cell elements and devices. As used herein the term "ophthalmic" means pertaining to or associated with the eye and vision. Non-limiting examples of ophthalmic elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors. As used herein the term "display" means the visible or machine-readable representation of information in words, numbers, symbols, designs or drawings. Non-limiting examples of display elements and devices include screens, monitors, and security elements, such as security marks. As used herein the term "window" means an aperture adapted to permit the transmission of radiation there-through. Non-limiting examples of windows include automotive and aircraft transparencies, filters, shutters, and optical switches. As used herein the term "mirror" means a surface that specularly reflects a large fraction of incident light.

In the making of an optical article, the polymerizable composition may be introduced into a mold of any desired shape at a temperature and for a time to form a polymerizate. After mixing of the components of the polymerizable composition to form a reaction mixture it is introduced, usually by injection, into a mold. The temperature of the reaction mixture as it is introduced into the mold is usually up to 130° C., often up to 120° C. The reaction mixture is held in the mold at a temperature and for a time sufficient to essentially cure the reaction mixture and form a molded optical article. The mold may have any shape desired for the final product as noted above. It is typically a lens mold; often a mold for an ophthalmic lens. The molded article may then be released from the mold. Optical articles prepared by the process of the present invention demonstrate high yield, high transparency, very low haze, low flow lines and low inclusions. Moreover, the optical articles prepared by the method of the present invention demonstrate minimal yellowing over time, less than that of a similar optical article prepared from a polymerizable composition that does not contain the pigment component in the present invention.

Various embodiments disclosed herein will now be illustrated in the following non-limiting examples.

EXAMPLES

Part 1: Preparation of Pigment Dispersions

Examples 1, 2 and 3 describe the preparation of pigment dispersions having an appropriately small average pigment particle size for use in an optical product having acceptable transmission and light scattering.

Commercially available pigments were milled and dispersed in the mill base formula described in the following Table 1 in a two-step process. Pre-dispersion was first accomplished using a basket mill, followed by final dispersion using an EMI Mini Mill from Engineered Mills, Inc. The final dispersion utilized 0.2-0.3 mm YTZ media, the dispersions were milled for the residence times indicated at the bottom of Table 1. The properties of the milled dispersions are given in Table 2.

TABLE 1

Pigment Dispersion Compositions

| Mill Base Ingredient | Amount (kg) | | |
|---|---|---|---|
| | Example 1 | Example 2 | Example 3 |
| SOLSPERSE ® 32500[1] | 0.91 | 7.50 | 1.34 |
| N-Butyl Acetate Urethane Grade | — | — | 0.11 |
| UltraMarine Violet Premiere PVX 6111[2] | 0.49 | — | — |
| PERRINDO ® Violet 29[3] | — | — | 0.28 |
| Tungsten Oxide $WO_{2.72}$[4] | — | 6.23 | — |
| Residence time in EMI Mini Mill (min) | 200 | 151 | 101 |

[1]A dispersant available from Lubrizol, Ltd.
[2]Available from Brenntag Specialties, Inc.
[3]A perylene pigment available from Sun Chemical.
[4]A Tungsten blue oxide available from Global Tungsten and Powders Corp.

TABLE 2

Pigment Dispersion Properties

| | Example 1 | Example 2 | Example 3 |
|---|---|---|---|
| Dilution for Color Measurement[5] (solvent:pigment) | 36/1 | 241/1 | 400/1 |
| Wavelength of Max Abs. (nm) | 520 | 700 | 490 |
| % Transmittance | 65.4 | 24.6 | 20.5 |
| Avg. Particle Size (nm)[6] | 150 | 52 | 223 |

[5]For color analysis, the final dispersions were diluted with solvent to achieve the stated transmittance at the wavelength of maximum absorbance and a path length of 0.5 mm.
[6]Particle size was measured using a Malvern Instruments Mastersizer 2000 ™.

Part 2; Preparation of Pigmented Polymerizable Compositions

Examples 4, 5 and 6 demonstrate the preparation of tinted optically transparent polymers employing radical initiators according to the present invention.

The pigmented polymerizable compositions of Examples 4, 5 and 6 were prepared by stirring together the components described in the following Table 3. The respective mixtures then were poured into a mold comprising two glass plates separated by a length of 6 mm diameter silicone rubber O-ring cord and secured by binder clips. The filled mold was placed in a programmable forced air over and cured according to the cycles listed in the following Table 4. The cured polymers were removed from the molds and allowed to cool to room temperature prior to measuring the transmitted polymer color properties reported in the following Table 5. All properties were measured using a HunterLab UltraSan PRO spectrophotometer according to ASTM E313-10°/D65 and the manufacturer's instructions. The path length for sheet samples is equal to the sample thickness.

TABLE 3

Pigmented Polymerizable Compositions

| | Amount (g) | | |
|---|---|---|---|
| | Example 4 | Example 5 | Example 6 |
| TRIGONOX ® ADC-NS-60[1] | 4.5 | 2.5 | — |
| CR-39 ® MADC[2] | 95.5 | 97.5 | — |
| TRIGONOX ® 141[3] | — | — | 0.51 |
| Sulfur-containing methacrylate functional monomer blend[4] | — | — | 75.3 |
| styrene | — | — | 23.3 |
| α-methyl styrene dimer | — | — | 0.93 |
| Pigment Dispersion of Example 1 | 0.0043 | — | — |
| Pigment Dispersion of Example 2 | — | 0.0005 | — |
| Pigment Dispersion of Example 3 | — | — | 0.0011 |

[1]A mixture of peroxydicarbonates available from AkzoNobel Polymer Chemicals.
[2]An optical monomer available from PPG Industries, Inc.
[3]An organic peroxide available from AkzoNobel Polymer Chemicals.
[4]Blend which was 25% by weight styrene and 75% by weight of sulfur-containing methacrylate functional monomer as described in Example 1 of US Patent Application Publication No. US 2013/0082220A1.

TABLE 4

Cure Cycles for Polymerizable Compositions

| | Example 4 | Example 5 | Example 6 |
|---|---|---|---|
| Cycle 1 | 3 hour hold at 38° C., 12 hr. ramp 38-78° C., 2.5 hr. hold 78° C., 0.5 hr. ramp 78-75° C., 4 hr. hold 75° C., 0.1 hr. ramp 75-70° C. | 3 hour hold at 38° C., 12 hr. ramp 38-78° C., 2.5 hr. hold 78° C., 0.5 hr. ramp 78-75° C., 4 hr. hold 75° C., 0.1 hr. ramp 75-70° C. | — |
| Cycle 2 | — | — | 10 hr. ramp 55-63° C., 6 hr. ramp 63-87° C., 2 hr. hold at 87° C. |

TABLE 5

| Pigmented Polymer Properties | | | |
|---|---|---|---|
| | Example 4 | Example 5 | Example 6 |
| Thickness (mm) | 5.5 | 5.5 | 3.5 |
| % Tv | 90.7 | 89.47 | 85.4 |
| % Haze | 0.9 | 0.2 | 0.3 |
| Yellowness Index | −0.32 | −1.31 | 2.7 |
| L* | 96.3 | 95.77 | 94.1 |
| a* | −0.06 | −0.42 | 1.5 |
| b* | −0.13 | −0.50 | 0.8 |

The present invention has been described with reference to specific details of particular embodiments thereof. It is not intended that such details be regarded as limitations upon the scope of the invention except insofar as and to the extent that they are included in the accompanying claims.

What is claimed is:

1. A polymerizable composition comprising:
   (a) a polymerizable component comprising allyl diglycol carbonate; and
   (b) a pigment component comprising:
      (i) an ionic or amphoteric dispersant material; and
      (ii) pigment nanoparticles uniformly dispersed in the dispersant material (i), wherein the nanoparticles have an average particle size of up to 500 nanometers.

2. The polymerizable composition of claim 1, wherein the polymerizable component (a) comprises a resinous component comprising at least one of monomers, oligomers, and/or prepolymers of any materials selected from the group consisting of allyl diglycol carbonate, poly(meth)acrylate, polycarbonate precursors, polyurethane precursors, polyureaurethane precursors, polythiourethane precursors, polyamide precursors, styrene, and mixtures thereof.

3. The polymerizable composition of claim 2, wherein the polymerizable component (a) further comprises poly(meth)acrylate.

4. The polymerizable composition of claim 3, wherein the polymerizable component (a) further comprises a radical initiator.

5. The polymerizable composition of claim 4, wherein the radical initiator comprises a peroxy initiator.

6. The polymerizable composition of claim 1, further comprising an ultraviolet light absorber and/or a hindered amine light stabilizer.

7. The polymerizable composition of claim 1, wherein the ionic or amphoteric dispersant material is derived from an acrylic polymer and/or polycaprolactone.

8. The polymerizable composition of claim 1, wherein the pigment nanoparticles (ii) have an average particle size of up to 200 nanometers.

9. The polymerizable composition of claim 1, wherein at least 90 percent of the pigment nanoparticles (ii) have an average particle size of up to 300 nanometers.

10. The polymerizable composition of claim 1, wherein the pigment nanoparticles (ii) are present in the polymerizable composition in an amount ranging from 0.01 to 1000 parts per million.

11. The polymerizable composition of claim 1, wherein the pigment nanoparticles (ii) are present in the polymerizable composition in an amount ranging from 0.05 to 50 parts per million.

12. The polymerizable composition of claim 1, wherein the pigment component (b) comprises organic pigment nanoparticles.

13. The polymerizable composition of claim 1, wherein the pigment component (b) comprises inorganic pigment nanoparticles.

14. The polymerizable composition of claim 13, wherein the inorganic pigment nanoparticles comprise (i) metal-containing inorganic pigments selected from the group consisting of ultramarine blue, ultramarine violet, reduced tungsten oxide, cobalt aluminate, cobalt phosphate, and manganese ammonium pyrophosphate; and/or (ii) metal-free inorganic pigments.

15. The polymerizable composition of claim 13, wherein the inorganic pigment nanoparticles comprise ultramarine blue, ultramarine violet, Prussian blue, cobalt blue and/or reduced tungsten oxide.

16. The polymerizable composition of claim 12, wherein the organic pigment nanoparticles comprise indanthrone, quinacridone, phthalocyanine blue, copper phthalocyanine blue, and/or perylene anthraquinone.

17. An optical article comprising a polymer prepared from the polymerizable composition of claim 1.

18. The optical article of claim 17, wherein the optical article is a lens, sheet product, scratch resistant lens, or scratch resistant sheet.

19. A polymerizable composition comprising:
   (a) a polymerizable component comprising:
      (i) diethylene glycol bis(allyl carbonate); and
      (ii) a radical initiator; and
   (b) a pigment component comprising:
      (i) an ionic or amphoteric dispersant material derived from polycaprolactone; and
      (ii) pigment nanoparticles comprising ultramarine blue uniformly dispersed in the dispersant material (i), wherein the nanoparticles have an average particle size of up to 500 nanometers.

* * * * *